3,686,022
PRODUCTION OF FILMS BY VAPOR
DEPOSITION AND IRRADIATION
Martin White, Brighton, England, and Peter Purnell Luff, Ottawa, Ontario, Canada, assignors to National Research Development Corporation, London, England
Filed Dec. 29, 1969, Ser. No. 888,433
Claims priority, application Great Britain, Jan. 2, 1969, 393/69
Int. Cl. B44d 1/50
U.S. Cl. 117—93.31
15 Claims

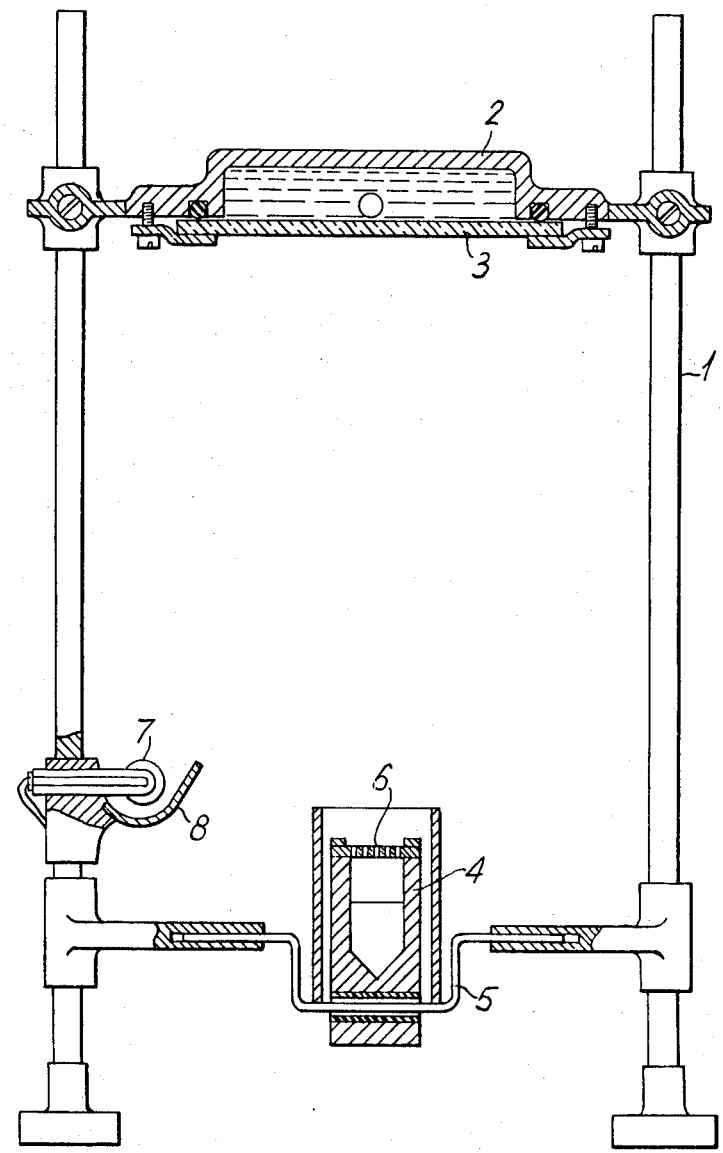

ABSTRACT OF THE DISCLOSURE

A process for the deposition of a thin polymer film on a cooled substrate which comprises heating a polymer in vacuo in the presence of the substrate so as to deposit polymeric material thereon and simultaneously irradiating the polymeric material during the entire period of deposition with radiation of sufficient energy to induce cross-linking in the polymer.

---

This invention relates to the production of thin polymer films and more particularly to the production of such films by evaporation of the polymer.

Thin films of polyethylene have been deposited on to glass substrates by conventional evaporating techniques giving rise to clear electrically insulating films which are easily removed from the substrate by abrasion with the finger.

It has now been found that the mechanical, optical, and other properties of thin films obtained by deposition of the polymer in vacuo are greatly improved if the material deposited on the substrate is subjected during deposition to radiation of sufficient energy to induce cross-linking.

According to the present invention a process for the deposition of a thin polymer film on a substrate comprises heating the polymer in vacuo in the presence of the substrate so as to deposit polymeric material thereon and simultaneously irradiating the polymeric material being deposited with radiation of sufficient energy to induce cross-linking in the polymer. The mechaniam by which polymeric material is transmitted from the bulk sample to the substrate may, for convenience, be termed "evaporation." In certain instances, the mechanism is one of true evaporation. In others, a process akin to true evaporation occurs in which vapour, formed by thermal degradation of the polymer, entrains small and probably liquid particles of the polymer and conveys such particles to the surface of the substrate; such a mechanism is for the purposes of this specification encompassed within the term "evaporation."

In addition to improvements in the mechanical and optical properties the degree of adhesion of the thin film to the substrate is also substantially improved by the process of this invention. It is believed that when the polymer is evaporated a considerable degree of thermal degradation takes place, but this is largely compensated for by the effect of the radiation upon the film. Preferably, irradiation of the substrate is commneced before polymeric material is deposited on it and for best results irradiation is continued for some time after the film has achieved the required thickness.

The present invention is applicable to a wide variety of linear polymers including the hydrocarbon, hydrouorocarbon, chlorohydrofluorocarbon and the corresponding perhalogeno polymers, and in particular those of the aliphatic series, for example, polyethylene, polypropylene and the corresponding fluoro substituted polymers, e.g. polytetrafluoro-ethylene. The invention is also aplicable to the polyamides e.g. nylon and the polyesters, especially the polycarbonates. Evaporation of the polymer is, of course, effected at low pressure, particularly at pressure of $10^{-4}$ torr and below, preferably at least $10^{-6}$ torr. The temperature required to obtain an appropriate rate of evaporation may be readily determined by experiment. In the case of polyethylene, for example, an evaporation temperature in the region of 340–360° C. is particularly effective at pressures in the range of $2-4 \times 10^{-5}$ torr.

In operating the process, the substrate on which the film is deposited is continually cooled in order to prevent reevaporation of the deposited film. The films may be stirpped from the substrate if desired or the process conducted in such a way as to provide a very firmly bound unit of substrate and film. Irradiation is usually conducted with ultra-violet light or light of shorter wavelength, but other types of radiation may be used if desired, e.g. electron beams of energy of the order of 4 electron volts and higher.

Thin films obtained in accordance with this invention are especially useful as dielectric materials in thin films, capacitors and miniature foil capacitors, having, for example, a breakdown strength of about 6 megavolts cm.$^{-1}$ for a polyethylene film with thickness 2000° A. compared with about 1 megavolt cm.$^{-1}$ for a non-irradiated film. Typical dielectric constants lie in the range 2.2–2.3 and a 150° A. film would have an associated capacitance of about 0.2$\mu$ F. Films may also be used as encapsulating materials for film and integrated circuit devices. Non-electrical uses for the film include, for example, optically transparent overlayers for surface mirrors as protection against dirt and oxidation or as protective materials for decorative surfaces, e.g. when deposited on metal films for use in the jewellery trade and elsewhere. The refractive index of irradiated polythene film is 1.51 and the optical transmission is 97% for a thickness of 1000° A.

One of the advantages of producing films from bulk polymer is that the process is especially convenient to operate and is subject to effective control. For example, a concentrated beam of material may be directed on to the substrate. In contrast deposition of monomer on to the substrate followed by polymerisation in situ would be far less easy to operate in practice.

As hereinbefre described a supported cross-linked polymer film may be derived by evaporative deposition with simultaneous irradiation. An adherent film of a cross-linked hydrocarbon, hydrohalocarbon or perhalocarbon may be deposited on a metallic or glassy surface of a substrate to provide a supported polymer film. The polymer film may alternatively be stripped from the substrate. Cross-linked polyethylene film when prepared as described above is amorphous and substantially insoluble in hot toluene.

The invention is illustrated in the accompanying schematic drawing:

The apparatus comprises a vacuum chamber (not shown) in which the apparatus illustrated is enclosed. The components illustrated include a jig 1 at the upper end of which is held a water cooled holder 2 which holds a glass substrate 3.

About 12 cms. below the substrate 3 a shielded stainless steel boat 4 containing pellets of polyethylene is supported. The boat 4 is heated by conduction from a molybdenum strip heater 5 clamped to its lower end and insulated from it by mica washers. The boat is fitted with a thermocouple (not shown) for monitoring the temperature of the boat.

The boat 4 is also provided with a perforated lid 6 which controls the rate of emission of evaporated material and prevents discontinuity in the deposited film. Also supported on the jig 1 and located about 9 cms. from the substrate 3 is a medium pressure mercury ultra-violet lamp 7 shielded from the boat 4 by a heat and radiation shield 8.

In operation the boat 4 is covered by a shutter (not shown) and its temperature raised to 350° C. whilst the pressure in the vacuum chamber is maintained at $10^{-5}$ torr. The lamp 7 is energised and radiation directed on to the substrate 3. The shutter 9 is then removed and a beam of material emitted through the perforated lid 6 is directed on to the substrate 3 and deposition is allowed to proceed at the rate of at least 30 angstroms per minute. At this rate, film thicknesses of about 2000 angstroms take about one hour to produce. Following deposition, irradiation is continued for a further period giving rise to an improvement of mechanical and optical properties. This additional period may be up to 4 hours depending on the intensity of the ultra-violet light.

If an adherent film is required, the substrate should of course be thoroughly cleaned, e.g. by know methods, before being placed in the vacuum chamber. In a typical cleaning procedure, a glass substrate is washed in a solvent, e.g. cold acetone, to remove any greasy deposits, followed by scrubbing with cotton wool and a detergent e.g. Teepol. It is then placed in a hot detergent solution and cleaned ultrasonically for five minutes. This is repeated twice more using distilled water. The substrate is then placed in an Elgastat Type B102 Deionizer which has been modified so that the deionized water which passes through a beaker containing the substrate is returned to the deionizing cartridge. The influent and effluent are monitored with a conductivity meter and when two readings are the same, the substrate is transferred to an isopropyl alcohol bath. It is suspended in the hot vapour for 90 minutes after which it is removed when required.

Using the apparatus described above, the rate of deposition of polyethylene film on the substrate has been measured for a number of evaporation temperatures in the range 280° to 400°. The shuttered boat was heated up slowly to the required temperature over a period of fifteen minutes after which the shutter was opened. Each run was continued for 45 minutes during which time the temperature of the boat was maintained to within ±2° C. The film thickness was continually monitored by a Crystal Monitor. The results are tabulated below.

| Boat temperature, ° C. | Crystal Monitor frequency change dF(Hz.) | Film thickness, Å. |
|---|---|---|
| 280 | 0 | 0 |
| 290 | 13 | 100 |
| 300 | 25 | 160 |
| 310 | 25 | 160 |
| 320 | 38 | 240 |
| 330 | 50 | 310 |
| 340 | 87 | 510 |
| 350 | 150 | 920 |
| 360 | 300 | 1,830 |
| 370 | 600 | 3,660 |

We claim:

1. A process for the deposition of a polymer film on a cooled substrate which comprises heating a polymer in vacuo in the presence of the substrate so as to deposit polymeric material thereon whilst subjecting the polymeric material being deposited to sustained irradiation of sufficient energy to induce cross-linking in the polymer.

2. A process according to claim 1, wherein after deposition of the polymeric material has ceased, irradiation of the deposited polymeric material is continued for a period sufficient to procure optimum mechanical properties in the polymer film.

3. A process according to claim 1, wherein the polymer which is heated is a linear hydrocarbon, hydrofluorocarbon, chlorohydrofluorocarbon, or perhalocarbon.

4. A process according to claim 1, wherein the polymer is polytetrafluoroethylene or polytetrafluoropropylene.

5. A process according to claim 1, wherein the polymer is polyethylene or polypropylene.

6. A process according to claim 1 wherein the polymer which is heated is a polyamide such as nylon.

7. A process according to claim 1 wherein the polymer is a polyester.

8. A process according to claim 7 wherein the polyester is a polycarbonate.

9. A process according to claim 1, wherein the polymer is heated to a temperature of between 340° and 360° C.

10. A process according to claim 9, wherein the polymer is heated to a temperature of 350° C. at a pressure of the order of $10^{-5}$ torr.

11. A process according to claim 1, wherein the polymer is heated under a pressure of $10^{-4}$ torr or less.

12. A process according to claim 1, wherein the pressure is $10^{-6}$ torr or less.

13. A process according to claim 1, wherein the radiation used is equivalent to at least four electron volts.

14. A process according to claim 1, wherein the substrate includes a metallic surface on which the polymeric material is deposited.

15. The process according to claim 1 wherein the sustained irradiation is ultraviolet radiation.

References Cited

UNITED STATES PATENTS

| 3,406,040 | 10/1968 | Da Silva et al. | 117—93.31 |
| 3,392,051 | 7/1968 | Caswell et al. | 117—93.31 X |
| 3,480,553 | 11/1969 | Wright et al. | 117—93.31 |
| 3,547,683 | 12/1970 | Williams et al. | 117—93.31 |

FOREIGN PATENTS

| 1,168,641 | 10/1969 | Great Britain | 17—93.31 |
| 722,866 | 2/1955 | Great Britain | 118—49 |

ALFRED L. LEAVITT, Primary Examiner

J. H. NEWSOME, Assistant Examiner

U.S. Cl. X.R.

117—106 R; 204—159.11